United States Patent
Nixon et al.

(10) Patent No.: US 7,933,594 B2
(45) Date of Patent: Apr. 26, 2011

(54) SELF-CONFIGURING COMMUNICATION NETWORKS FOR USE WITH PROCESS CONTROL SYSTEMS

(75) Inventors: Mark J. Nixon, Round Rock, TX (US); Tom Aneweer, Round Rock, TX (US); Kent Burr, Round Rock, TX (US); Ron Eddie, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 23 days.

(21) Appl. No.: 12/140,571

(22) Filed: Jun. 17, 2008

(65) Prior Publication Data

US 2008/0250162 A1 Oct. 9, 2008

Related U.S. Application Data

(62) Division of application No. 10/464,087, filed on Jun. 18, 2003, now Pat. No. 7,460,865.

(51) Int. Cl.
*H04Q 7/20* (2006.01)
(52) U.S. Cl. ......... 455/428; 455/450; 370/254; 370/328
(58) Field of Classification Search .............. 370/310, 370/328, 254, 401; 455/450, 428, 550.1, 455/456.1, 456.5
See application file for complete search history.

(56) References Cited

U.S. PATENT DOCUMENTS

| | | | |
|---|---|---|---|
| 5,566,356 A | 10/1996 | Taketsugu | |
| 5,682,476 A | 10/1997 | Tapperson et al. | |
| 5,973,643 A * | 10/1999 | Hawkes et al. | 342/457 |
| 5,974,320 A | 10/1999 | Ward et al. | |
| 6,091,951 A | 7/2000 | Sturniolo et al. | |
| 6,091,954 A | 7/2000 | Haartsen et al. | |
| 6,286,038 B1 | 9/2001 | Reichmeyer et al. | |
| 6,490,297 B1 | 12/2002 | Kraml et al. | |
| 6,826,385 B2 | 11/2004 | Kujala | |
| 6,847,997 B1 | 1/2005 | Kleiner | |
| 6,862,460 B2 | 3/2005 | Safadi | |
| 6,975,873 B1 * | 12/2005 | Banks et al. | 455/456.5 |
| 7,283,832 B2 | 10/2007 | Jia et al. | |
| 7,353,023 B1 * | 4/2008 | Link et al. | 455/433 |

(Continued)

FOREIGN PATENT DOCUMENTS

CN 1387324 12/2002

(Continued)

OTHER PUBLICATIONS

"First Office Action," issued by the Chinese Intellectual Property Office, in connection with Chinese patent application No. 2004100794746, on Aug. 24, 2007 (7 pages).

(Continued)

*Primary Examiner* — Congvan Tran
(74) *Attorney, Agent, or Firm* — Hanley, Flight & Zimmerman, LLC (57) ABSTRACT

Disclosed herein are methods, apparatus and articles of manufacture for configuring a communication network associated with a plurality of wireless enabled field devices. The disclosed methods, apparatus and articles of manufacture may compare identification information associated with a wireless enabled field device to configuration database information. Configuration information associated with the wireless enabled field device may be retrieved based on the comparison of the identification information to the configuration database information. The retrieved configuration information is sent to the wireless enabled field device via at least one wireless communication link to configure the wireless enabled field device.

21 Claims, 8 Drawing Sheets

U.S. PATENT DOCUMENTS

| | | | |
|---|---|---|---|
| 7,460,865 B2 | 12/2008 | Nixon et al. | |
| 7,482,929 B2 * | 1/2009 | Bowers et al. | 340/572.1 |
| 2002/0102995 A1 * | 8/2002 | Zelmanovich et al. | 455/456 |
| 2002/0169977 A1 | 11/2002 | Chmaytelli | |
| 2003/0054868 A1 * | 3/2003 | Paulsen et al. | 463/1 |
| 2003/0171827 A1 | 9/2003 | Keyes et al. | |
| 2004/0203355 A1 * | 10/2004 | Light et al. | 455/41.1 |
| 2004/0203434 A1 | 10/2004 | Karschnia et al. | |
| 2004/0203863 A1 * | 10/2004 | Huomo | 455/456.1 |
| 2008/0291013 A1 * | 11/2008 | McCown et al. | 340/539.13 |

FOREIGN PATENT DOCUMENTS

| | | |
|---|---|---|
| EP | 0961184 | 12/1999 |
| EP | 1045302 | 10/2000 |
| EP | 1258991 | 11/2002 |
| GB | 2277849 | 11/1994 |
| GB | 2318252 | 4/1998 |
| GB | 2345827 | 7/2000 |
| GB | 2352539 | 1/2001 |
| WO | 9211736 | 7/1992 |
| WO | 9836335 | 8/1998 |

OTHER PUBLICATIONS

"Search Report Under Section 17(5)," issued by the United Kingdom Intellectual Property Office on Oct. 13, 2004, in connection with United Kingdom patent application No. GB0413581.0, (3 pages).

"Examination Report Under Section 18(3)," issued by the United Kingdom Intellectual Property Office on Sep. 29, 2005, in connection with United Kingdom patent application No. GB0413581.0 (4 pages).

"Combined Search and Examination Report Under Sections 17 amd 18(3)," issued by the United Kingdom Intellectual Property Office on Oct. 25, 2006, in connection with United Kingdom patent application No. GB0616898.3 (6 pages).

Restriction Requirement, issued by the United States Patent and Trademark Office in connection with U.S. Appl. No. 10/464,087, on May 25, 2005, 4 pages.

Non-Final Office Action, issued by the United States Patent and Trademark Office in connection with U.S. Appl. No. 10/464,087, on Nov. 1, 2005, 6 pages.

Final Rejection, issued by the United States Patent and Trademark Office in connection with U.S. Appl. No. 10/464,087, on Jun. 9, 2006.

Final Rejection, issued by the United States Patent and Trademark Office in connection with U.S. Appl. No. 10/464,087, on Nov. 6, 2006, 7 pages.

Notice of Allowance, issued by the United States Patent and Trademark Office in connection with U.S. Appl. No. 10/464,087, on Mar. 18, 2008, 7 pages.

"Decisoon of Rejection," issued by the Japanese Patent Intellectual Property Office in connection with Japanese Application No. 2004-179085, on Nov. 24, 2010, 2 pages.

* cited by examiner

SELF-CONFIGURING COMMUNICATION NETWORKS FOR USE WITH PROCESS CONTROL SYSTEMS

RELATED APPLICATION

This patent is a divisional of U.S. patent application Ser. No. 10/464,087, filed Jun. 18, 2003, which is hereby incorporated herein by reference in its entirety.

TECHNICAL FIELD

The present disclosure generally relates to process control systems and, more particularly, to self-configuring communication networks for use with process control systems.

BACKGROUND

Process control systems are widely used in factories and/or plants in which products are manufactured or processes are controlled (e.g., chemical manufacturing, power plant control, etc.) Process control systems are also used in the harvesting of natural resources such as, for example, oil and gas drilling and handling processes, etc. Virtually any manufacturing process, resource harvesting process, etc. can be automated through the application of one or more process control systems.

The manner in which process control systems are implemented has evolved over the years. Older generations of process control systems were typically implemented using dedicated, centralized hardware. However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more controllers via one or more digital data busses. Of course, many of these modern process control systems may also include non-smart field devices such as, for example, 4-20 milliamp (MA) devices, 0-10 volts direct current (VDC) devices, etc., which are typically directly coupled to controllers as opposed to a shared digital data bus or the like.

In any event, field devices include, for example, input devices (e.g., devices such as sensors that provide status signals that are indicative of process control parameters such as, for example, temperature, pressure, flow rate, etc.), as well as control operators or actuators that perform actions in response to commands received from controllers and/or other field devices. For example, a controller may send signals to a valve to increase pressure or flow, to a heater or chiller to change a temperature, to a mixer to agitate ingredients in a process control system, etc.

One particularly important aspect of process control system design involves the manner in which field devices are communicatively coupled to each other, controllers and other systems or devices within a process control system. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the I/O communications network is subjected to environmental factors or conditions associated with the process control system. For example, many industrial control applications often subject field devices and their associated I/O communication networks to harsh physical environments (e.g., high, low or highly variable ambient temperatures, vibrations, corrosive gases or liquids, etc.), difficult electrical environments (e.g., high noise environments, poor power quality, transient voltages, etc.), etc. In any case, environmental factors can compromise the integrity of communications between one or more field devices, controllers, etc. In some cases, such compromised communications could prevent the process control system from carrying out its control routines in an effective or proper manner, which could result in reduced process control system efficiency and/or profitability, excessive wear or damage to equipment, dangerous conditions that could damage or destroy equipment, building structures and/or people, etc.

Historically, the I/O communication networks used in process control systems have been hardwired networks. In particular, the field devices within these process control systems have typically been communicatively coupled to controllers, workstations, and other process control system components using a hierarchical topology in which non-smart field devices are directly coupled to controllers using analog interfaces such as, for example, 4-20 mA, 0-10 VDC, etc. In many cases, smart field devices are also used and are coupled via hardwired digital data busses, which are coupled to controllers via smart field device interface devices.

While hardwired I/O communication networks can initially provide a robust I/O communication network, their robustness can be seriously degraded over time as a result of environmental stresses (e.g., corrosive gases or liquids, vibration, humidity, etc.). For example, contact resistances associated with the I/O communication network wiring may increase substantially due to corrosion, oxidation and the like. In addition, wiring insulation and/or shielding may degrade or fail, thereby creating a condition under which environmental electrical interference or noise can more easily corrupt the signals transmitted via the I/O communication network wires. In some cases, failed insulation may result in a short circuit condition that results in a complete failure of the associated I/O communication wires.

Additionally, hardwired I/O communication networks are typically expensive to install, particularly in cases where the I/O communication network is associated with a large industrial plant or facility that is distributed over a relatively large geographic area. In many instances, the wiring associated with the I/O communication network may have to span relatively long distances and/or through, under or around many structures (e.g., walls, buildings, equipment, etc.) Such long wiring runs typically involve substantial amounts of labor and, thus, expense. Further, such long wiring runs are especially susceptible to signal degradation due to wiring impedances and coupled electrical interference, both of which can result in unreliable communications.

Hardwired I/O communication networks are also typically very difficult to reconfigure. For example, adding a new field device typically requires the installation of wires between the new field device and a controller. Retrofitting a field device in this manner may be very difficult and expensive due to the long wiring runs and space constraints that are often found in older process control plants and/or systems. For example, high wire counts within conduits, equipment and/or structures interposing along available wiring paths, etc., may significantly increase the difficulty associated with retrofitting field devices to an existing system. Similarly, changing an existing field device with a new device having different field wiring requirements may present the same difficulties in the case where more and/or different wires have to be installed to accommodate the new device.

Wireless I/O communication networks are often used to alleviate some of the difficulties associated with hardwired I/O networks. However, most, if not all, wireless I/O communication networks are implemented using relatively expensive hardware devices (e.g., wireless enabled routers, hubs, switches, etc.), most of which consume a relatively large amount of power. In addition, known wireless I/O communication networks, including the hardware and software associated therewith, use point-to-point communication paths that are carefully selected during installation and fixed during subsequent operation of the system. Establishing the fixed communication paths within these known wireless I/O communication networks typically involves the use of one or more experts to perform an expensive site survey that enables the experts to determine the types and/or locations of the transceivers and other communication equipment. Further, once the fixed point-to-point communication paths have been selected via the site survey results, one or more of the experts must then configure equipment, tune antennas, etc.

While known wireless I/O communication networks can, for example, alleviate the long term robustness issues associated with hardwired communication paths, these known wireless I/O communication networks are relatively inflexible. Specifically, because point-to-point communication paths are used, retrofitting one or more additional or different field devices to an established wireless I/O communication network may require relatively extensive reconfiguration of the existing communication paths to accommodate a new or changed communication path. Further, adding or changing a communication path may require the services of one or more experts to develop a new or revised site survey and to configure or reconfigure equipment, antennas, etc. to accommodate the additional or different field devices. Thus, due to the costs associated with installing a wireless I/O communication network (e.g., site surveys, expert configuration, etc.), wireless I/O communication networks are often cost prohibitive, particularly for relatively large process control systems such as those typically used in industrial applications.

A further difficulty with most, if not all, hardwired and wireless I/O communication networks is that the physical locations and connections associated with the field devices in systems employing such networks are dependent on the logical control strategy. In other words, the logical control strategy is developed to associate particular field devices with particular communication paths and physical locations throughout the process control system. As a result, changing the location of a field device and/or the communication path (s) coupling that communication device to a controller implementing at least a part of the overall control strategy (which uses that field device) typically requires corresponding changes to the control strategy. Such changes to the control strategy may involve time consuming, and, thus, expensive effort by a system operator or other user via one or more system workstations.

Likewise, replacement of a damaged or failing field device is a relatively time consuming process with existing hardwired and wireless I/O communication networks. For example, when a field device (e.g., a valve, a temperature sensor, etc.) fails or is failing in the field, maintenance personnel typically replace the field device. However, before such a replacement may be made, a replacement device must be programmed, which includes storing a unique identifier used by the failing or failed field device in the replacement field device. This programming is not typically performed in the field, but is usually carried out by maintenance personnel at a central station. Subsequent to programming at the central station, the replacement device is taken into the field and installed. In situations where multiple field devices are distributed across a wide geographical area, programming replacement components at a central station is time consuming because multiple trips from the field to the central station may be required, depending upon when maintenance personnel become aware of a need to replace the field devices.

In addition to unique identifiers, smart field devices also typically store other data and/or routines. Accordingly, in addition to programming replacement devices with the appropriate unique identifier, replacement devices must also be programmed with the latest versions of processes or routines stored in the failed devices at the time of their removal.

As will be readily appreciated from the foregoing, programming replacement field devices with unique identifiers, processes, routines and/or other process control data can be very cumbersome, especially in situations in which the field devices are distributed across wide geographical areas. Additionally, while the foregoing has described problems associated with replacing field device components, those having ordinary skill in the art will readily recognize that components other than field devices within a process control system are also cumbersome to replace. For example, the replacement of controllers, input/output (I/O) devices (wireless or wired), communications hubs, etc. also requires significant reprogramming effort. Accordingly, the replacement of any process control component or device and the reprogramming associated therewith can prove very time consuming and expensive.

SUMMARY

In accordance with one aspect, a method and apparatus for configuring a wireless enabled field device receives identification information associated with the wireless enabled field device and compares the identification information to configuration database information. The method and apparatus may also retrieve configuration information associated with the wireless enabled field device based on the comparison of the identification information to the configuration database information. Additionally, the method and apparatus may send the configuration information to the wireless enabled field device via at least one wireless communication link to configure the wireless enabled field device.

In accordance with another aspect, a method of replacing a wireless enabled field device includes storing an identifier associated with the wireless enabled field device in a memory accessible to a second wireless enabled field device, removing the wireless enabled field device and installing the second wireless enabled field device in place of the removed wireless enabled field device. The method may also include processing a commissioning request associated with the second wireless enabled field device. The commissioning request may include the identifier associated with the wireless enabled field device. Still further, the method may include using the identifier associated with the wireless enabled field device to retrieve commissioning information from a database and sending the commissioning information to the second wireless enabled field device via at least one wireless communication link.

In accordance with yet another aspect, a system and method for establishing a communication network for use in a process control system having a controller and a plurality of wireless enabled field devices may identify a plurality of wireless communication links available for routing communications between the wireless enabled field devices and the controller. In addition, the system and method may automatically assign ones of the plurality of wireless communication links to the wireless enabled field devices based on predetermined signal criteria.

DETAILED DESCRIPTION

Figure 1:
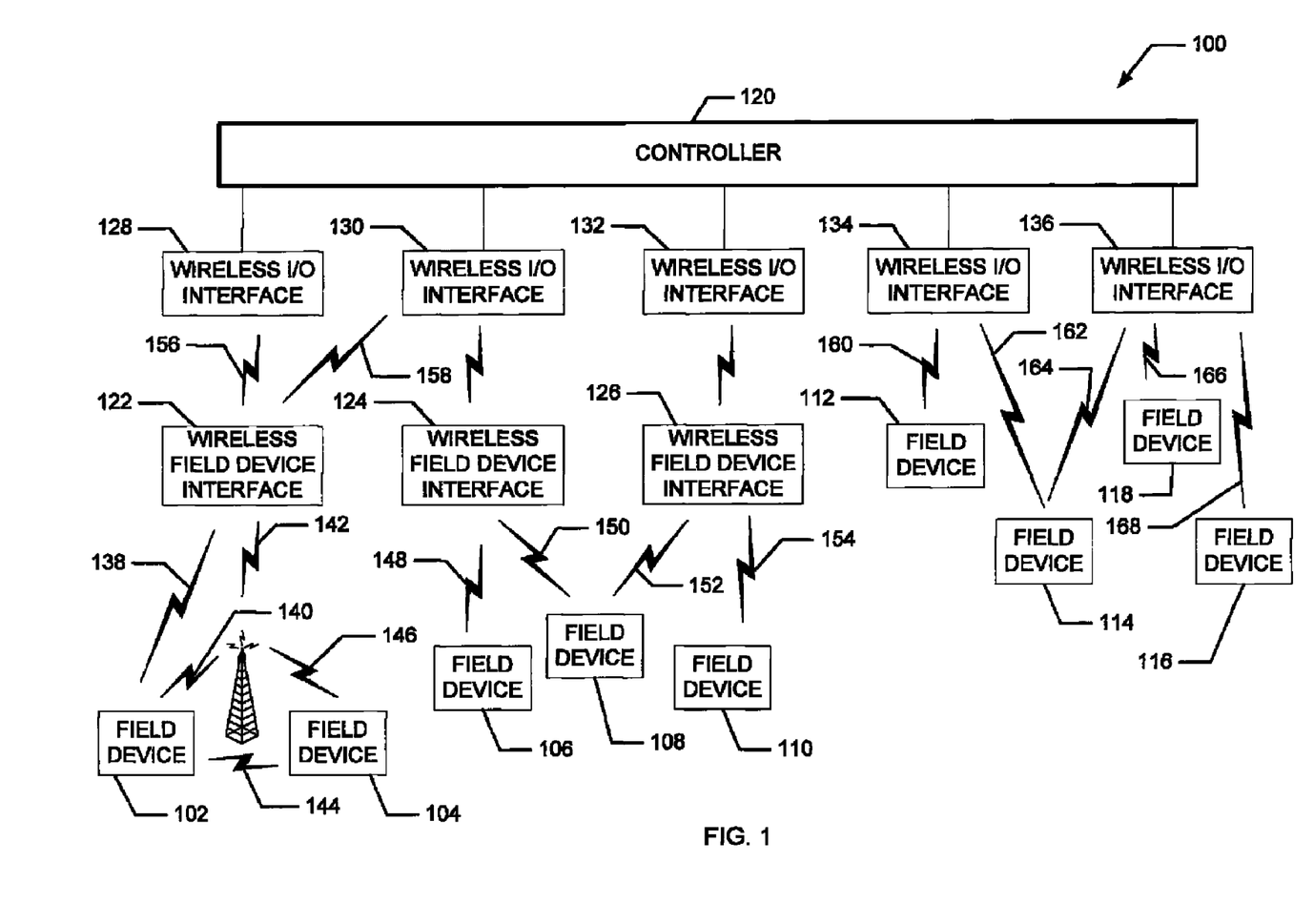
FIG. 1 is a block diagram of an example of a portion of a process control system having a wireless I/O communication network.

FIG. 1 is a block diagram of an example of a portion of a process control system 100 having a wireless I/O communication network. As shown in FIG. 1, the portion of the process control system 100 includes a plurality of wireless field devices 102-118. In general, the field devices 102-118 are communicatively coupled to a controller 120 via wireless field device interfaces 122-126 and wireless input/output (I/O) interfaces 128-136.

As described in greater detail herein, the field devices 102-118 may include smart and non-smart types of field devices that are enabled to perform wireless communications with other similarly enabled field devices, one or more of the wireless field device interfaces 122-126 and/or one or more of the wireless I/O interfaces 128-136. Specifically, each of the field devices 102-118 may be configured to communicate via one or multiple wireless communication channels paths or links with other ones of the field devices 102-118, the wireless field device interfaces 122-126 and/or the wireless I/O interfaces 128-136. As a result, if desired, each of the field devices 102-118 may be able to communicate with the controller 120 via multiple or redundant communication channels, paths or links.

In addition, as described in greater detail below, the field devices 102-118 are configured to enable automatic or self-configuration of a wireless I/O communication network. For example, the wireless communication paths established to communicatively couple each of the field devices 102-118 to the controller 120 may be automatically determined within the system 100 (or automatically determined in conjunction with other devices or systems such as those shown in FIG. 4) to provide the most robust or effective wireless communications possible for a given hardware configuration and operating environment conditions (e.g., power quality, noise, cost of service, propagation delay, transmission error rates, etc.) Further, the resulting automatically established wireless I/O communication network may enable a self-healing function, in which a field device experiencing a failing, failed or otherwise problematic communication link automatically establishes a new communication link or uses a redundant communication link to maintain communications integrity (e.g., signal quality, signal strength, etc.) within the I/O communication network.

Still further, in addition to the wireless enabled field devices described herein such as, for example, the field devices 102-118 shown in FIG. 1, being able to automatically establish communications via one or more wireless communication channels, paths or links with the controller 120, the wireless enabled field devices described herein can be automatically commissioned or configured without requiring any intervention from a system operator or other personnel. As a result, new and/or different (e.g., replacement, retrofit, etc.) field devices may be added to the system 100 and utilized within an existing logical control strategy without requiring any user intervention (e.g., programming, configuration or commissioning activities, etc.) Thus, the wireless enabled field devices and I/O communication network described herein provides a separation or independence between the physical communication paths or links used by the wireless enabled field devices and the logical connections or relationships between the field devices as defined by the process control strategy (or portion thereof) being carried out by the system 100.

Now turning in detail to the example system 100 shown in FIG. 1, the field devices 102-118 may be sensors (e.g., temperature sensors, humidity sensors, etc.), operators or actuators (e.g., values, damper motors, etc.) or any other types of field devices that have been enabled to perform wireless communications. For example, the field devices 102-118 may include otherwise conventional field devices having analog or digital outputs (e.g., 4-20 mA, 0-10 VDC, variable frequency, etc.) that are coupled to a wireless interface device such as that shown in FIG. 2. Alternatively, the field devices 102-118 may integrally incorporate a wireless communication interface instead of or in addition to a conventional interface (e.g., 4-20 mA).

As described in greater detail in connection with FIG. 2 below, the wireless enabled field devices 102-118 may use any desired wireless communication technique. If desired, the wireless enabled field devices 102-108 may use more than one communication technique using multiple types of media at the same time. For example, the wireless communication interface within each of the wireless enabled field devices 102-118 may be configured to transmit and receive information (e.g., process control information, protocol information, version information, timestamps, loading information, addressing information, etc.) in an analog or digital format at any desirable communication frequency using any desired modulation and/or communication protocol. More specifically, the wireless communication interfaces used by the wireless enabled field devices 102-118 may be implemented using such as EmberNet from Ember Corporation, Axonn LLC Wireless technology from and/or using spread spectrum communications over radio frequencies of 900 MHz and/or 2.4 GHz using products such as those offered by AEROCOM. Examples of such devices using spread spectrum communications are the RF MicroAnalyzer System from Computational System, Inc. Another example of a wireless device is the EchoNet wireless ultrasonic level transmitter from Flowline, which uses a cellular network to create network connections. Still further, mobile messaging technologies and services (e.g. GSM, SMS, MMS, EMS) may be used to provide I/O communications over a wide area network. The wireless communications associated with the field devices 102-122 may also make use of a standard such as the IEEE 1451 and/or 80211, which are wireless standards for wireless sensing, Bluetooth-type signals and/or any other desired protocol or standard.

Radio communications may be used to connect one or more of the field devices 102-118 to the wireless field device interfaces 122-126. As with the wireless enabled field devices 102-118, the wireless field device interfaces 122-126 may serve as communication hubs and may be implemented using, for example, EmberNet from Ember Corporation, Axonn LLC Wireless technology or using spread spectrum radio communications over radio frequencies of 900 megahertz (MHz) and/or 2.4 gigahertz (GHz) using products such as those offered by AEROCOM. The radio communications may also make use of communications standards or protocols, such as the IEEE 1451 wireless standard for wireless sensing, Bluetooth, Modbus, etc. In general, the wireless field device interfaces 122-126 may be used to form one or more wireless field nodes. For example, the field devices 102 and 104 and the wireless field device interface 122 may form one field node and the field devices 106-110 and the wireless field device interfaces 124 and 126 may form another wireless field node. Such wireless field nodes are typically, but not necessarily, physically remotely located from the controller 120. Each of the wireless field device interfaces 122-126 may include wireless communication interface circuitry such as that depicted by way of example and described in greater detail below in connection with FIG. 3.

Wireless communications with the controller 120 are carried out between the wireless field device interfaces 122-126 and the field devices 112-118 via the wireless I/O interfaces 128-136. The wireless I/O interfaces 128-136 use a communication protocol or scheme that is compatible with the communications of the wireless field device interfaces 122-126 and the wireless enabled field devices 112-118. For example, the wireless I/O interfaces 128-136 may each include one or more wireless communications interfaces similar or identical to the example interface shown and described below in connection with FIG. 3. However, in contrast to the wireless field device interfaces 122-126, the wireless I/O interfaces 128-136 may be physically configured to be electrically coupled to the controller 120 via a pluggable card edge connector, railbus connector, or the like.

The controller 120 may be implemented using any desirable controller such as, for example, a DeltaV™ controller, which is commercially available from Fisher-Rosemount Systems, Inc. The controller 120 may communicate with the field devices 102-118 (either directly via the wireless I/O interfaces 134 and 136 or directly via the wireless field device interfaces 122-126) to implement an entire or a portion of a process control strategy. The controller 120 may be further coupled to other controllers, workstations, etc. (none of which are shown) to cooperate in the execution of a control strategy. In any case, controllers and the manner of implementing control strategies therewith are well known and, thus, are not described in greater detail herein.

Regardless of the communication protocols used by the wireless enabled field devices 102-118, the field devices 102-118 can automatically detect and communicate via one or more available communication paths or links. More generally, the wireless enabled field devices 102-118, the wireless field device interfaces 122-126, the wireless I/O interfaces 128-136 and the controller 120 can assess the characteristics and/or quality of their local available communication channels, paths or links and cooperate to automatically form a robust wireless I/O communication network. In particular, by selecting and using a combination of available wireless communication channels, paths or links that provides the highest quality or best possible communications integrity for an I/O communication network, the robustness and/or integrity of the I/O communication network can be maximized for any given hardware configuration and set of environmental conditions.

The field devices 102-118 may use a number of criteria for selecting from available communication channels, paths or links. For example, because shorter communication paths or links (e.g., shorter distances, fewer logical hops) are generally preferable to longer paths or links, each of the field devices 102-118 may preferably select the shortest possible link or combination of links that enables it to exchange information with the controller 120. In this manner, the configuration or layout of the I/O communication network formed by the field devices 102-118 can be kept physically close to the control strategy as opposed to using a more centralized I/O communication network layout, which is typical of previously known I/O communication networks. Other considerations such as signal strength, signal quality, communications interference, logical hops, etc. may also be used by the field devices 102-118 to select appropriate ones of available communication channels, paths or links for forming a robust wireless I/O communication network.

To further increase the robustness of the resulting wireless I/O communication network, one or more of the field devices 102-118 may elect to use multiple or redundant communication channels, paths or links for communicating with the controller 120. For example, one or more of the field devices 102-118 may determine that available communication channels, paths or links are of relatively poor quality and, as a result, may elect to communicate with the controller 120 via two or more channels, paths or links simultaneously. As noted above, the two or more channels, paths or links may be implemented using different communication protocols and/or media. In this manner, one or more of the field devices 102-118 and/or the controller 120 can continuously assess which communication channels, paths or links are currently providing the highest quality transmission characteristics and signals and selectively extract control information from those high quality signals as they are identified. However, the wireless enabled field devices 102-118 may establish and use multiple or redundant communication channels, paths or links in different manners. For example, one or more of the wireless enabled field devices 102-118 may actively select one from a plurality of available communication channels, paths or links to communicate with the controller 120. In that case, the one or more of the wireless enabled field devices 102-118 may select as needed (i.e., on-the-fly) one communication channel, path or link for its communications communicates with the controller 120. Of course, if one of the wireless enabled field devices 102-118 determines that the signal quality and/or transmission characteristics of a communication channel, path or link currently being used has degraded relative to another available channel, path or link, or if the transmission characteristics or signal quality associated with another available channel, path or link has become relatively better, that one of the wireless enabled field devices 102-118 may then route its communications via that other channel, path or link.

Turning in detail to the example system 100 shown in FIG. 1, the wireless enabled field devices 102 and 104 may communicate with the controller 120 via a plurality of different channels, paths or links 138-146. For example, the field device 102 may communicate with the controller 120 through the wireless field device interface 122 and the wireless I/O interface 128 via the communication link 138, via the combination of the communication links 140 and 142 and/or via the combination of the communication links 144, 146 and 142. Likewise, the field device 104 may communicate with the controller 120 via a combination of the communication links 146 and 142, a combination of the communication links 144, 140 and 142, and/or a combination of the communication links 144 and 138. As described above, one or both of the wireless enabled field devices 102 and 104 may be configured to establish multiple or redundant communication paths with the controller 120. In that case, if desired, one or both of the wireless enabled field devices 102 and 104 may communicate with the controller 120 via multiple communication paths simultaneously. Additionally or alternatively, one or both of the wireless enabled field devices 102 and 104 may continuously or periodically select the best one of a plurality of available communication channels, paths or links for communicating with the controller 120.

In addition to being configured to use multiple communication paths to communicate with the controller 120 via a single wireless field device interface such as, for example, the manner in which the field devices 102 and 104 are depicted in FIG. 1, the wireless enabled field devices 102-118 and wireless field device interfaces 122-126 may also be configured to communicate with each other via multiple or redundant communication paths. As shown in FIG. 1, the wireless enabled field devices 106-110 are configured to communicate with the wireless field device interfaces 124 and 126 via communication links 148-154. In particular, the wireless enabled field device 108 is shown as being configured to communicate with either or both of the wireless field device interfaces 124 and 126 via the communication links 150 and 152, respectively. More generally, although not shown for purposes of clarity, any of the wireless enabled field devices 102-110 may be configured to communicate with one or more of the wireless field device interfaces 122-126 either directly and/or through other ones of the field devices 102-110. As a result, if any one of the wireless field device interfaces 122-126 were to fail or otherwise provide poor communications, the wireless enabled field devices currently communicating with the controller 120 through that failed one of the wireless field device interfaces 122-126 could re-route communications through another available one of the wireless field device interfaces 122-126, either directly and/or through other ones of the field devices 102-110.

The wireless field device interfaces 122-126 may also be configured to communicate with the controller 120 via more than one of the wireless I/O interfaces 128-136. For example, as shown in FIG. 1, the wireless field device interface 122 may be configured to establish communications with the controller 120 via one or both of the communication links 156 and 158. Thus, in the event that the wireless field device interface 122 experiences communication difficulties with the wireless I/O interface 128, the wireless field device interface 122 can continue or begin communications with the controller 120 via the communication link 158 and the wireless I/O interface 130. Of course, communication links between any of the wireless field device interfaces 122-126 and any of the wireless I/O interfaces 128-136 may be established, if needed or desired, but have not been shown in FIG. 1 for purposes of clarity.

In the case where wireless enabled field devices are physically close to the controller 120, one or more of those wireless enabled field devices may be configured to communicate directly with one or more of the wireless I/O interfaces 128-136. For example, as shown in FIG. 1, the wireless enabled field devices 112-118 are depicted as being configured to communicate with the controller 120 via communication links 160-168 and wireless I/O interfaces 134 and 136. Of course, one or more of the field devices 112-118 could be configured to communicate with more than one of the wireless I/O interfaces 128-136 either directly or, alternatively, through other ones of the wireless enabled field devices 112-118. As depicted by way of example in FIG. 1, the wireless enabled field device 114 is configured to communicate with the wireless I/O interfaces 134 and 136 via the respective links 162 and 164.

As described in greater detail below, upon initial installation of each of the wireless enabled field devices 102-118, each of the field devices 102-118 initially identifies available communication channels, paths or links by which communications with the controller 120 may be established. Preferred channels, paths or links for each of the field devices 102-118 may be selected based on signal strengths, transmission channel characteristics, etc. so that, ultimately, the highest quality, most robust combination of communication channels, paths or links are used to form the resulting I/O communication network for the example system 100.

Once established, the I/O communication network may adaptively change to correct for changes in environmental conditions, the movement, replacement and/or addition of wireless enabled field devices to the system 100 or any other changes affecting communications. For example, if the wireless enabled field device 102 experiences communication difficulties (e.g., degradation in signal quality) when using the communication link 138, the field device 102 could automatically re-route its communications via the links 140 and 142 and/or via the combination of the links 144, 146 and 142. Also, for example, if the wireless enabled field device 108 is physically moved away from the wireless field device interface 124 and closer to the wireless field device interface 126, the wireless enabled field device 108 may stop using the communication link 150 in favor of the communication link 152. In another example, if the wireless enabled field device 116 is not initially installed in the system 100 and is added following an initial configuration of the I/O communication network, the wireless enabled field device 116 may automatically establish the communication link 168 with the wireless I/O interface 136 to communicate with the controller 120.

In any case, the controller 120 continuously or periodically monitors the I/O communication network and maps its logical control strategy to the current physical configuration of the I/O communication network. Thus, the logical control strategy implemented by the controller 120 can operate independently or separately from the physical aspects of the I/O communication network formed by the wireless enabled field devices 102-118, the wireless field device interfaces 122-126 and the wireless I/O interfaces 128-136. In other words, in contrast to many past systems, changing physical conditions associated with the I/O communication network such as, for example, changing communication paths, the movement, addition and/or removal and replacement of field devices, etc. typically will not result in changes to the logical control strategy, which would otherwise require a system operator or other user to reconfigure the control strategy.

In addition to control information and/or control parameters such as, for example, flows, temperatures, levels, set points, etc., the wireless enabled field devices 102-118 may exchange other types of information with the controller 120. For example, the wireless enabled field devices 102-118 may provide status information and/or diagnostic information to the controller 120. In particular, the wireless enabled field devices 102-118 may provide communication signal quality or strength information, communication retries, time stamps, which may be used to identify stale or replayed data or information, etc. Such I/O communication network status information may be used by the controller 120, and/or by some other system, workstation, etc. coupled to the controller 120, to automatically reconfigure the I/O communication network to alleviate or eliminate a communication problem.

Further, the system 100 may also enable a user or other operator to specify fixed communication paths and/or alternate and/or redundant communication paths via which certain ones of the wireless enabled field devices 102-118 should (i.e., preferably) or must use to communicate with the controller 120. Still further, the wireless enabled field devices 102-118, the wireless field device interfaces 122-126 and/or the wireless I/O interfaces 128-136 may detect communication drop outs (e.g., a loss or degradation of communications for at least a predetermined period of time) and flag data associated with such drop outs as questionable, bad, uncertain, etc.

The communications used by the wireless enabled field devices 102-118, the wireless field device interfaces 122-126 and the wireless I/O interfaces 128-136 may be secured communications. For example, the wireless communications may utilize any desired encoding and/or encryption scheme to prevent unauthorized persons from accessing the information contained in the communications. In addition, password protection and other known or developed security techniques may be employed as needed to provide a desired degree of security. Encoding schemes may be employed by the wireless enabled field devices 102-118, the wireless field device interfaces 122-126, the wireless I/O interfaces 128-136 and/or the controller 120 to enable communications integrity to be checked. The results of such error checking may be used to reorganize the I/O communication network (e.g., use alternate or redundant communication paths) to alleviate or eliminate the error(s).

As described in greater detail in connection with FIGS. 2-4 below, one or more of the wireless enabled field devices 102-118 may be conventional field devices having, for example, 4-20 mA and HART compliant interfaces, that have been provided with a wireless communications interface such as the example interface shown in FIG. 2. In this manner, the wireless I/O communication network described herein can be used together with hardwired I/O connections for some or all of the field devices within an I/O network. For example, in some examples, the methods and apparatus of the wireless I/O communication network described herein may be retrofitted to an existing hardwired I/O communication network, thereby providing a robust I/O communication network having both hardwired and wireless communication paths. In some cases, particularly in the case of an older hardwired I/O communication network in which the integrity of the wiring, connections, etc. and the communication signals carried thereby have become degraded or otherwise unreliable, the wireless I/O communication network described herein may be retrofit to that system and the hardwired communication paths may be phased out or eliminated as confidence is gained in the wireless I/O communication network. Additionally, in the case where the wireless I/O communication network described herein is used in conjunction with, for example, 4-20 mA and/or HART compliant field devices, the information or parameters associated with the HART signals is conveyed to the controller 120 via the wireless links associated with those devices. In this manner, the controller 120 can, if desired, utilize the additional information that may be provided by HART signals or the like.

As can be appreciated from the foregoing, the wireless enabled field devices 102-118 can automatically detect available communication channels, paths or links and select a set or combination of channels, paths or links that provides the best or most robust overall communications with the controller 120. As a result, the wireless enabled field devices 102-118 in conjunction with the wireless field device interfaces 122-126 and the wireless I/O interfaces 128-136 enable the system 100 to provide a self-configuring (e.g., automatically configurable) I/O communication network, thereby substantially reducing or eliminating expenses associated with site surveys, expert assistance, etc. that were typically incurred during configuration of known wireless communications systems. Furthermore, because the wireless enabled field devices 102-118 can detect communication difficulties and/or failures and automatically re-route communications as needed to alleviate or eliminate the communication problems, the I/O communication network formed by the example system 100 shown in FIG. 1 is self-correcting or self-healing and, thus, more robust than known I/O communication networks, which typically require user or system operator intervention to alleviate or eliminate a communication failure or difficulty. Still further, the wireless I/O communication network methods and apparatus described herein can be incorporated into an existing hardwired I/O communication network or an existing known wireless communication network (e.g., a traditional point-to-point type communication network). In this way, the communications performance within existing hardwired and/or traditional wireless systems, particularly those in which wiring has become questionable or otherwise degraded, can be substantially improved without having to suffer the expense of a complete system tear down, which may require a complete shut down of the system.

Figure 2:
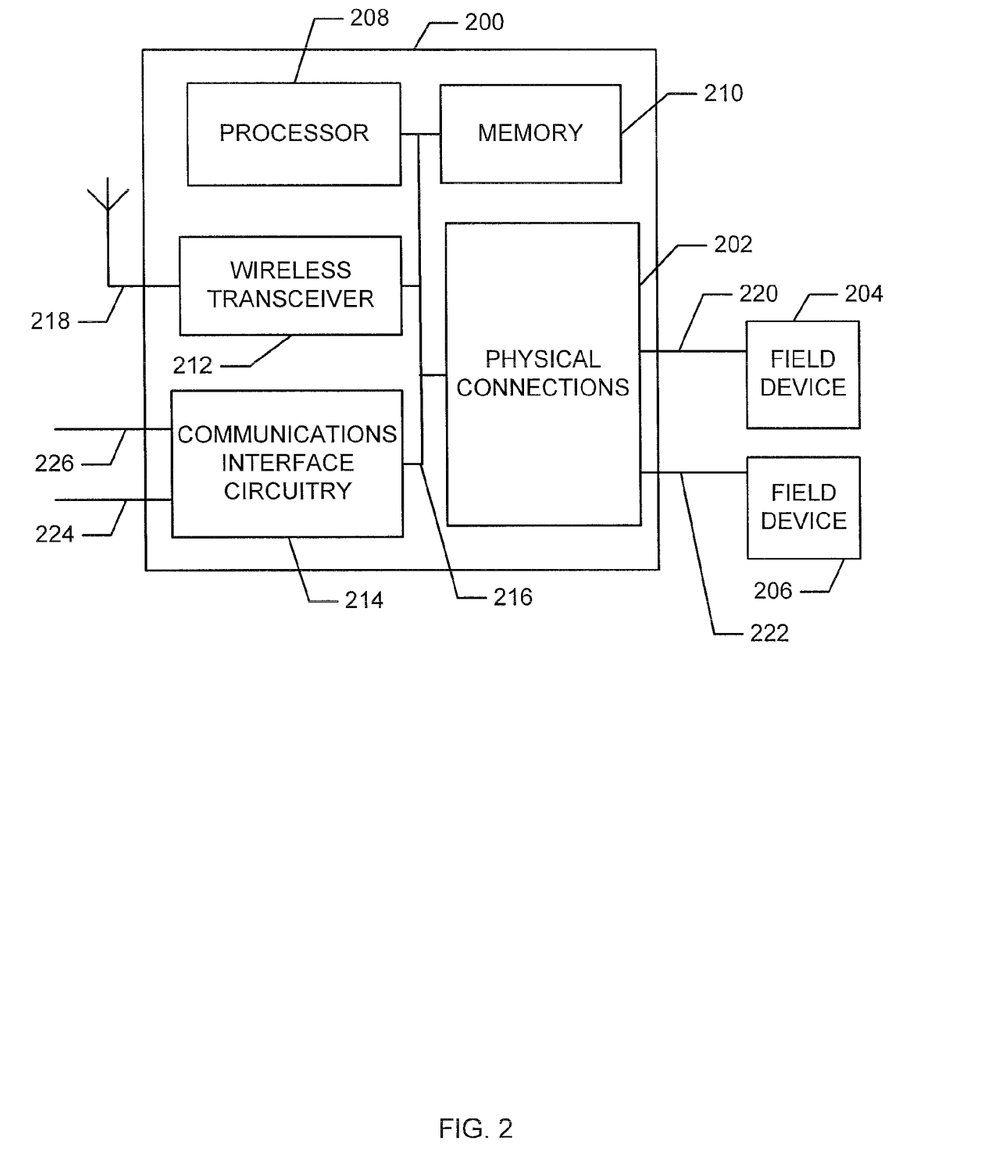
FIG. 2 is a block diagram of an example of a wireless interface device that may be used with field devices to enable wireless communications with the field devices

FIG. 2 is a block diagram of an example of a wireless interface device 200 that may be used with field devices to enable wireless communications with the field devices. As shown in FIG. 2, the wireless interface device 200 may include physical connections 202 for electrically coupling signals from one or more field devices 204 and 206 to the wireless interface device 200. A processor 208, a memory 210, a wireless transceiver 212 and communications interface circuitry 214 may all be coupled to one or more of the physical connections 202 via a bus 216. The bus 216 may be implemented using a plurality of wires, circuit traces, etc. The wireless transceiver 200 is configured to send and receive radio communications via an antenna 218 to one or more other wireless enabled field devices, wireless field device interfaces and/or wireless I/O interfaces (e.g., the field devices 102-118, the wireless field device interfaces 122-126 and/or the wireless I/O interfaces 128-136 shown in FIG. 1).

Now turning in detail to the wireless interface device 200 shown in FIG. 2, the physical connections 202 may provide screw terminals, pluggable connections (e.g., a female or male header), insulation displacement connections, or any other desired type of electrical connectors. The field devices 204 and 206 may be, for example, 4-20 mA HART protocol compliant field devices, which are commonly available. In that case, the 4-20 mA signals and HART signals are conveyed via wires 220 and 222, which are terminated at the physical connections 202. The wires 220 and 222 may be multi-conductor wires or cables, twisted-pair cabling, or any suitable type of wires for conveying electrical signals from the field devices 204 and 206 to the physical connections 202.

The communications interface circuitry 214 may receive signals from the field devices 204 and 206 via the physical connections 202 and the bus 216 and, in turn, may condition or otherwise process these signals for use by the processor 208. In particular, the communications interface circuitry 214 may include level shifting circuits, over-voltage protection circuits, transient protection circuits, static discharge protection circuits, short circuit protection circuits, noise filters, anti-aliasing filters, amplification and/or buffer circuits, attenuation circuits, analog-to-digital converter circuits, digital-to-analog converter circuits, etc. In cases where it is desired to maintain an existing hardwired I/O communication network, the communications interface circuitry 214 may output via lines 224 and 226 duplicates of the signals output by the field devices 204 and 206 on wires 220 and 222. Thus, in the case where the field devices 204 and 206 provide 4-20 mA outputs, the communications interface circuitry 214 outputs substantially identical 4-20 mA signals on lines 224 and 226 for use by the existing hardwired I/O communication network.

The communications interface circuitry 214 may convert analog signals (e.g., 4-20 mA signals) received from the field devices 204 and 206 into digital information, which may then be conveyed via the bus 216 and processed by the processor 208. Alternatively or additionally, the communications interface circuitry 214 may receive digital information or commands from the processor 208 and may convert the information or commands to one or more analog signals (e.g., 4-20 mA signals) to be output to the field devices 204 and 206. In addition, the communications interface circuitry 214 may be configured to extract digital information provided together with analog signals by the field devices 204 and 206. For example, in the case where the field devices 204 and 206 are HART compliant devices, the device information contained in the HART compliant portion of the 4-20 mA signals associated with the field devices 204 and 206 may be extracted by the communications interface circuitry 214, conveyed to the processor 208 and subsequently transmitted via the wireless transceiver 212.

The memory 210 may be a solid state memory such as, for example, a static random access memory, a dynamic random access memory, an electrically erasable programmable read only memory, flash memory, etc., may be any desired type of magnetic or optical storage media such as, for example, a disk drive, may be a removable memory device such as a smart card, or any other type of memory or combination of memory devices. In any case, the memory 210 is readable by the processor 208 and has software or instructions stored thereon that, when executed, cause the processor 208 to carry out one or more of the methods described herein.

The wireless transceiver 212 is configured to communicate with the processor 208 via the bus 216 and to communicate using radio signals and any desired wireless communication standard or protocol via the antenna 218. Preferably, but not necessarily, the wireless transceiver 212 and the processor 208 cooperate to implement a wireless communication protocol that enables the field devices 204 and 206 to use multiple communication links simultaneously. For example, packet-based transmission protocols may be used to enable the field devices 204 and 206 to locally broadcast their process control information, diagnostic information, etc. to, for example, more than one other wireless field device interface, wireless I/O interface and other wireless enabled field devices. In addition, the processor 208 and wireless transceiver 212 may, for example, use systems and software commercially available from Ember Corporation and/or Axonn LLC to implement the wireless I/O communication network methods and systems described herein.

Regardless of the specific manner in which the processor 208 and the wireless transceiver 218 cooperate to implement the wireless I/O communication network systems and methods described herein, the wireless interface device 200 enables the field devices 204 and 206 to convey process control information, control parameters, diagnostic information, etc. using radio signals to the controller 120 (FIG. 1). In the event that the wireless interface device 200 is implemented as a unit or module that is physically separate from the field devices to which it interfaces, the interface device 200 may be fabricated using, for example, one or more printed circuit boards including integrated circuits, passive components, discrete semiconductor devices, etc. disposed within a housing or the like (not shown). In that case, the housing associated with the wireless interface device 200 may be configured to facilitate its attachment to a field device, equipment, a wall, or any other surface. Alternatively, the wireless interface device 200 may be integrated within each field device (e.g., the wireless enabled field devices 102-118 shown in FIG. 1). In the case where the wireless interface device 200 is integrated within the field devices, the physical connections 202 may be unused or eliminated entirely and connections between the field devices 204 and 206 and the functional blocks 208-214 of the wireless interface device 200 may be made via circuit traces, wires or the like.

Regardless of the specific physical configuration of the wireless interface device 200, the wireless interface device 200 may derive its power from the field devices to which it is connected or otherwise associated. In addition, the wireless interface device 200 may, if desired, be made suitable for use in environments requiring intrinsically safe devices.

Figure 3:
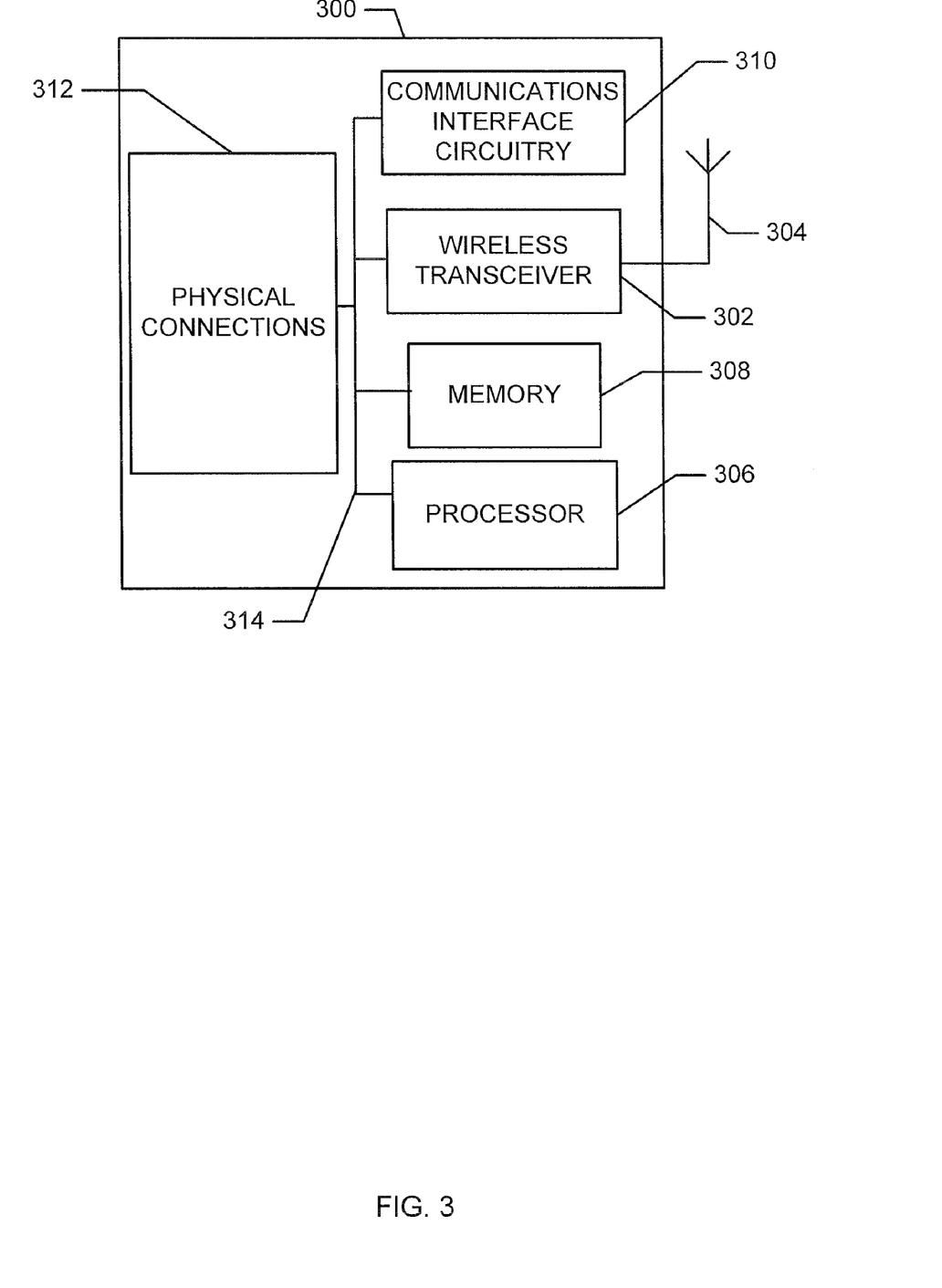
FIG. 3 is a block diagram of an example of a wireless interface device that may be used to communicate with wireless enabled field devices.

FIG. 3 is a block diagram of an example of a wireless interface device 300 that may be used to communicate with wireless enabled field devices. In general, the wireless interface device 300 of FIG. 3 is complementary to the example wireless interface device 200 shown in FIG. 2. As shown in FIG. 3, the wireless interface device 300 includes a wireless transceiver 302 coupled to an antenna 304, a processor 306, a memory 308, communications interface circuitry 310, physical connections 312, all of which may be communicatively coupled via a bus 314.

The wireless interface device 300 may be used within, for example, one of the wireless field device interfaces 122-126 (FIG. 1) to enable communications with, for example, one or more of the field devices 102-110 (FIG. 1). Thus, the wireless transceiver 302 is configured to communicate with the wireless transceiver 218 (FIG. 2). The wireless interface device 300 shown in FIG. 3 may also be used within the wireless I/O interfaces 128-136 (FIG. 1) to enable direct communications with field devices (e.g., the wireless enabled field devices 112-118 of FIG. 1) and/or wireless field device interfaces 122-126 (FIG. 1).

While the processor 306, memory 308, wireless transceiver 302 and communications interface circuitry 310 blocks may be similar or identical to the processor 208, memory 210, wireless transceiver 218 and communications interface circuitry 214 blocks of the wireless interface device 200 shown in FIG. 2, the physical connections 312 may be adapted to suit the different connection requirements of the wireless field device interfaces 122-126 (FIG. 1) and the wireless I/O interfaces 128-136 (FIG. 1). For example, when used with the wireless I/O interfaces 128-136 (FIG. 1), the physical connections 312 may be an edge connector for mating with a railbus. On the other hand, when used with the wireless field device interfaces 122-126 (FIG. 1), the physical connections 312 may, for example, be screw terminals and the like and/or wire pigtails for connection to a power source.

Figure 4:
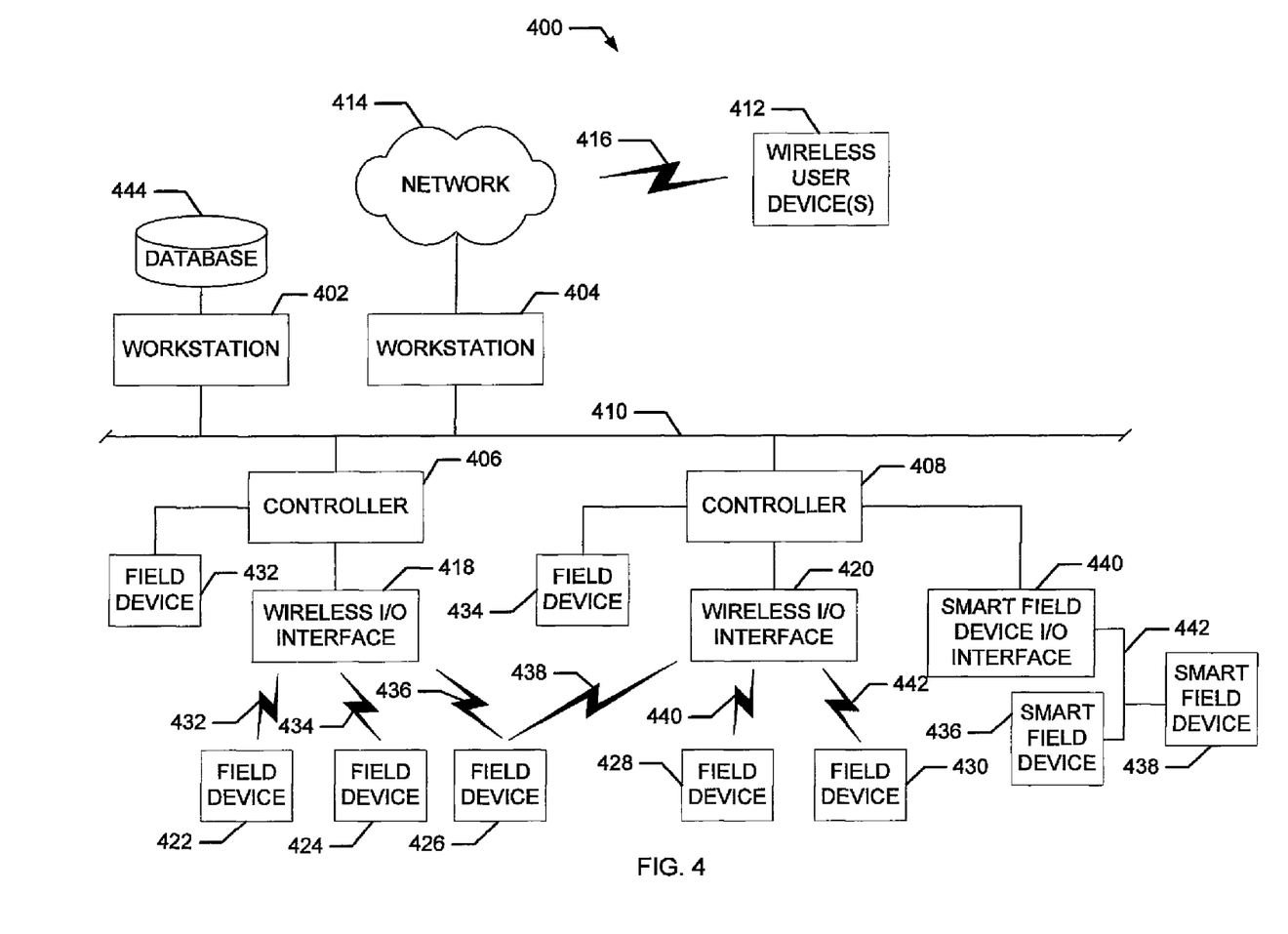
FIG. 4 is a block diagram of an example of a process control system that may implement the wireless I/O communication network described herein.

FIG. 4 is a block diagram of an example of a process control system 400 that may implement the wireless I/O communication network described herein. As depicted in FIG. 4, the process control system 400 includes one or more workstations 402 and 404 and one or more controllers 406 and 408, all of which are communicatively coupled via a bus 410. Alternatively, the workstations 402 and 404 may each be implemented using a personal computer executing instructions stored thereon. In any event, the workstations 402 and 404 may perform configuration tasks, enterprise optimization and/or management tasks, campaign management tasks, system diagnostic tasks, communication tasks, etc. For example, the workstation 402 may include software or routines that, when executed, enable a system operator to query the status of one or more field devices, controllers, etc., to run a diagnostic routine to diagnose one or more problems associate with an alert or alarm, etc. The workstation 404, on the other hand, may include software or routines that, when executed, orchestrate the overall operation of the system 400 to carry out a batch process or some other process control scheme, coordinate communications between wireless user devices 412 via a network 414 and wireless communication links 416, etc.

The bus 410 may be a conventional hardwired bus, local area network (LAN) or the like. For example, the bus 410 may be a conventional Ethernet-based bus. Although not shown in FIG. 4, additional or redundant communication busses or links between the workstations 402 and 404 and/or the controllers 406 and 408 may be employed if desired.

In addition to processing alarm or alert information, performing diagnostic routines, performing batch management routines, maintenance management routines, etc., one or both of the workstations 402 and 404 may be configured download control strategy information (e.g., process control routines or portions thereof) to the controllers 406 and 408. The controllers 406 and 408 may be implemented using any suitable controller such as, for example, the DeltaV controller, which is commercially available from Fisher-Rosemount Systems, Inc. of Austin, Tex.

The controllers 406 and 408 are coupled to respective wireless I/O interfaces 418 and 420, which are similar or identical to the wireless I/O interfaces 128-136 shown and described in connection with FIG. 1. A plurality of wireless enabled field devices 422-430 are communicatively coupled through the wireless I/O interfaces 418 and 420 via channels, paths or links 432-442 to the controllers 406 and 408.

In addition to being in communication with the wireless enabled field devices 422-430, the controllers 406 and 408 may also be coupled to one or more non-smart field devices 432 and 434. The non-smart field devices 432 and 434 may be conventional 4-20 mA, 0-10 VDC, or any other type of non-smart field device. The controller 408 is also communicatively coupled to a plurality of smart field devices 436 and 438 via an I/O device 440. The smart field devices 436 and 438 may be Fieldbus devices, HART devices, Profibus devices, or any other type of smart field devices that communicate on a digital data bus 442 using a known digital data transmission protocol. Such smart field devices are well known and, thus, are not described further herein.

As depicted in FIG. 4, the workstation 402 is coupled to a database 444, which may be implemented using any desired type of memory. For example, the database 444 may include any desired combination of magnetic, optical and solid state memory devices. The database 444 may be used by the workstation 402 to store process control information, control parameters, configuration information, diagnostic information, etc., some or all of which may be associated with the wireless enabled field devices 422-430.

The network 414 may be a wide area network implemented using any desired combination of hardwired networks (e.g., the public switched telephone network, the Internet, etc.) and wireless networks (e.g., cellular radio communication networks, satellite communications networks, etc.) In particular, in the case where some or all the network 414 uses wireless communications, communications may be compliant with the Global System for Mobile communications (GSM) and/or Cellular Digital Packet Data (CDPD), GPRS, TDMA-based, and/or CDMA-based protocols. Accordingly, the wireless user devices 412 may be mobile phones, pagers, wireless enabled personal data assistants, wireless enabled lap top computers, etc. The wireless user devices 412 may be configured to receive, for example, alert information, diagnostic information, or any other process control information related to the wireless enabled field devices 422-430, the non-smart field devices 432 and 434 and the smart field devices 436 and 438. Further, the wireless user devices 412 may also be configured to send control or command information, requests for information, or any other information to the workstations 402 and 404, the controllers 406 and 408 and/or the field devices 422-438. In this manner, a service technician, field manager, or any other system user or operator can interoperate with the control system 400 from virtually any remote location.

Figure 5:
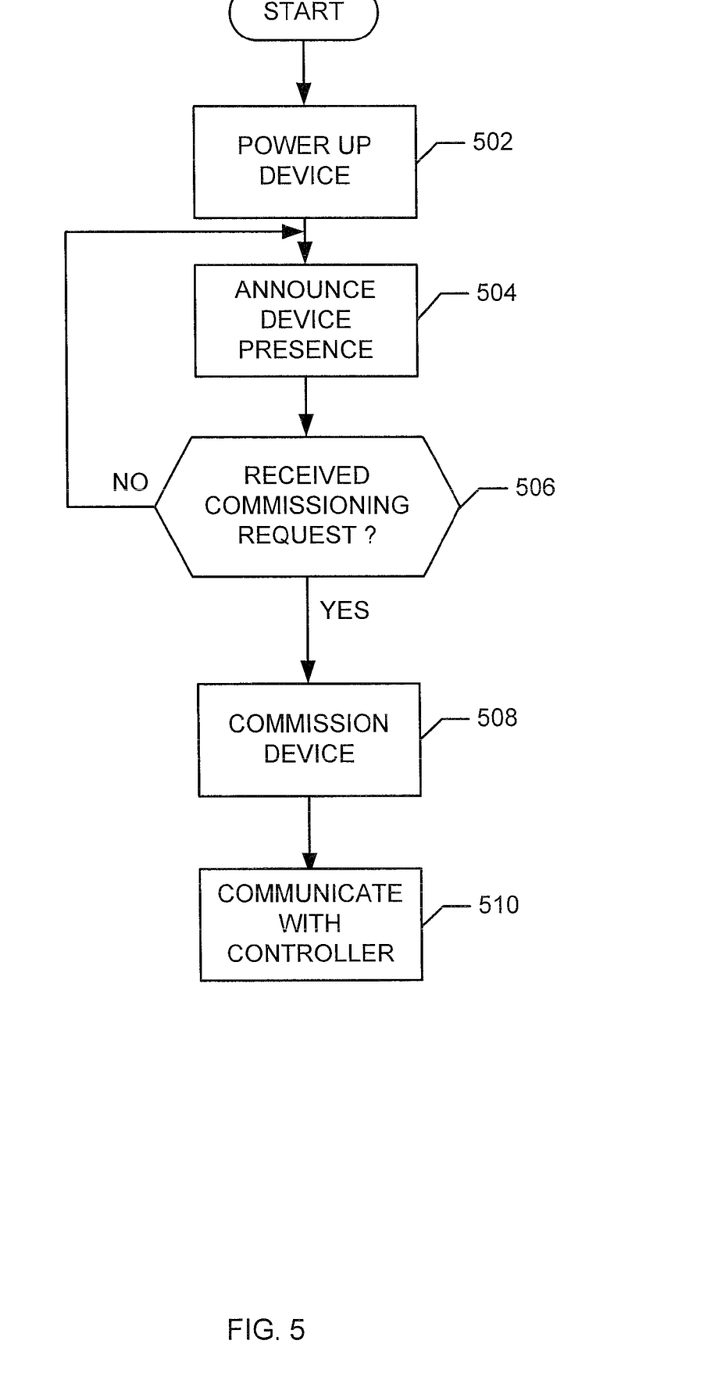
FIGS. 5, 6 and 7 are flow diagrams depicting an example manner in which a wireless field device may be commissioned.
Figure 6:
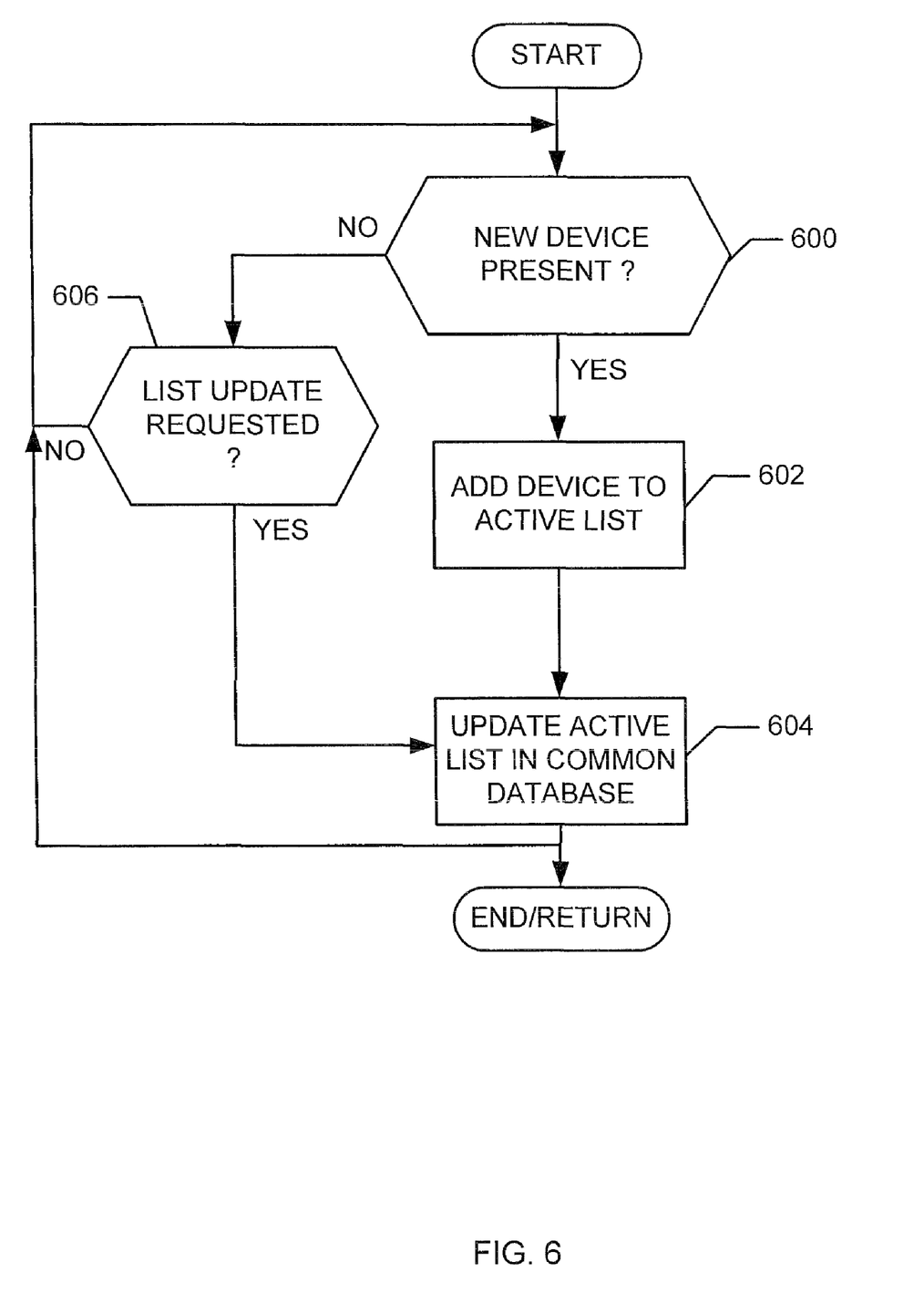
Figure 7:
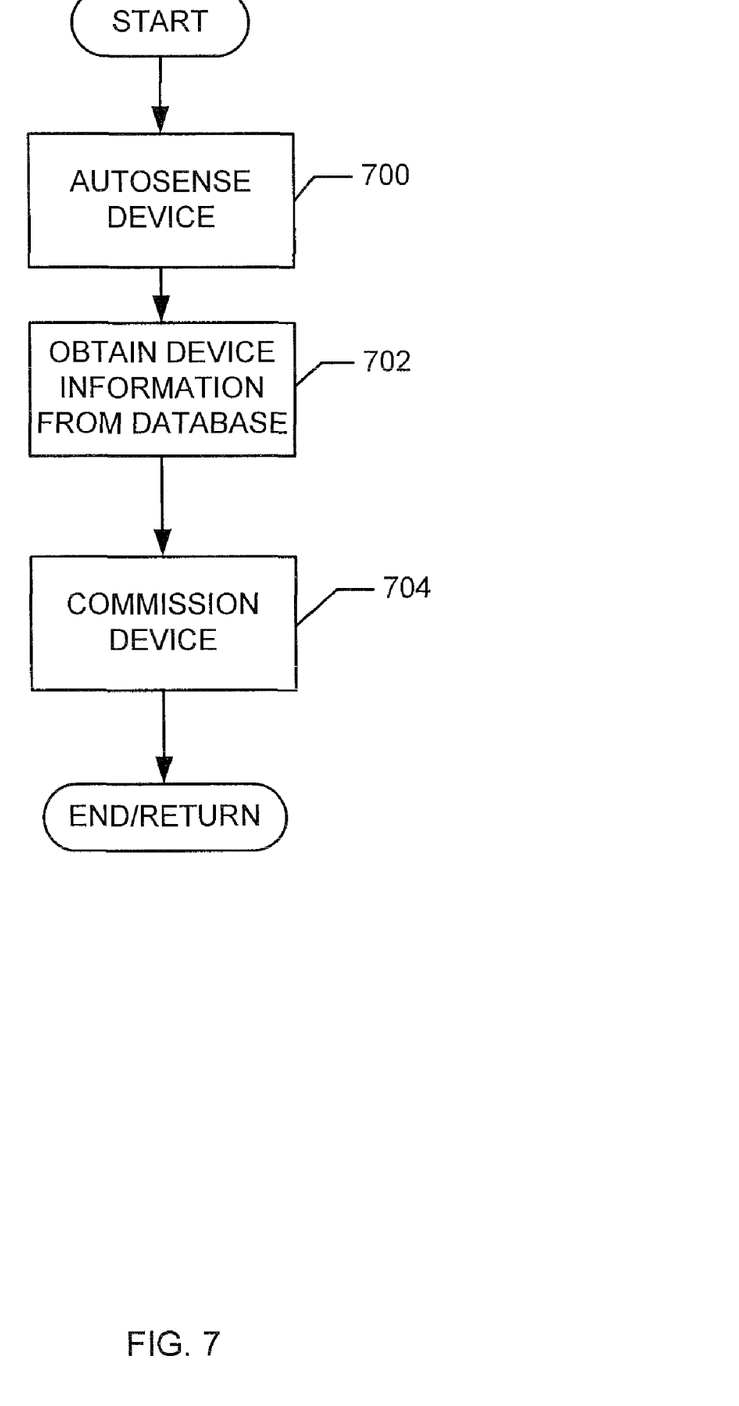

FIGS. 5, 6 and 7 are flow diagrams depicting an example manner in which a wireless field device may be commissioned using the methods and apparatus described herein. Turning to FIG. 5, when a wireless enabled field device (e.g., one of the wireless enabled field devices 422-430 of FIG. 4) is added to a process control system (e.g., the process control system 400 of FIG. 4), moved within the process control system and/or replaced, it initially powers up (block 502). Following power up, the wireless enabled field device announces its presence (block 504). To announce its presence, a wireless enabled field device may periodically or continuously broadcast one or more messages indicating its presence via all communication channels, paths or links available to the wireless enabled field device. The broadcast messages may contain field device identification information (e.g., a tag) and may be received by, for example, one or more wireless I/O interfaces (e.g., the wireless I/O interfaces 418 and 420) and conveyed to one or more controllers (e.g., the controllers 406 and 408) associated with the wireless I/O interfaces.

The wireless enabled field device checks to determine it has received a commissioning request (block 506) and, if a commissioning request has not been received, the wireless enabled field device continues to announce its presence (block 504). On the other hand, if the wireless enabled field device receives a commissioning request (block 506), it is then commissioned (block 508). Such commissioning may include storage and/or activation of control strategies, parameters, etc. that are downloaded and stored within the wireless enabled field device. Once commissioned, the wireless enabled field device communicates with the controller (via, for example, a wireless I/O interface) with which it has been configured to communicate (block 510).

FIG. 6 illustrates an example manner in which a controller responds to wireless enabled field device announcements. As depicted in FIG. 6, the controller determines if there are any new devices present (block 600). For example, the controller may process all messages being received and determine if any of those messages indicate the presence of a new device (e.g., a device requiring commissioning). If a new device is detected, the controller may add the information associated with that new device (e.g., the tag or other identification) to a list of active devices stored in a memory (not shown) accessible by the controller (block 602). The controller may then upload its active list information to common database (e.g., the database 444 of FIG. 4) associated with a workstation (e.g., the workstation 402 of FIG. 4) (block 604). The manner in which the active list information is used by the workstation to facilitate or carry out the commissioning process is described below in connection with FIG. 7. After the controller has uploaded or updated the common database with the new device information (block 604), the controller returns to detecting whether or not any new devices are present (block 600). If a new device is not detected at block 600, the controller checks whether a request for an updated active list has been received (block 606). If a request for an updated active list has been received at block 606, the controller uploads or updates the active list in the common database (block 604). On the other hand, if such a request has not been received at block 606, the controller returns control to block 600.

FIG. 7 depicts an example manner in which a workstation (e.g., the workstation 402) may automatically sense and configure wireless enabled field devices based on active list information received from one or more controllers. The workstation (e.g., the workstation 402) automatically senses new wireless enabled field devices (block 700) by reviewing its consolidated active list (i.e., the combination of active lists received from one or more controllers) stored within its database (e.g., the database 444) and comparing that consolidated active list to a configuration database or information (which may also be stored within, for example, the database 444). For example, the workstation may compare tag information and/or other device identification information. The information in the configuration database may include commissioning information for the field devices to be used within a process control system and may be generated by a system designed or other system user and pre-stored in the database prior to operation of the control system.

In any event, commissioning information associated with devices that are within the active list and which are also stored within the configuration database is retrieved from the configuration database (block 702) and automatically downloaded to the appropriate devices (block 704). Devices within the consolidated active list that are not assigned to a control strategy (e.g., device for which configuration information may not have been pre-stored within the configuration database), may be selected for configuration by a system designer or other user and commissioned at the command of that designer or other user.

Figure 8:
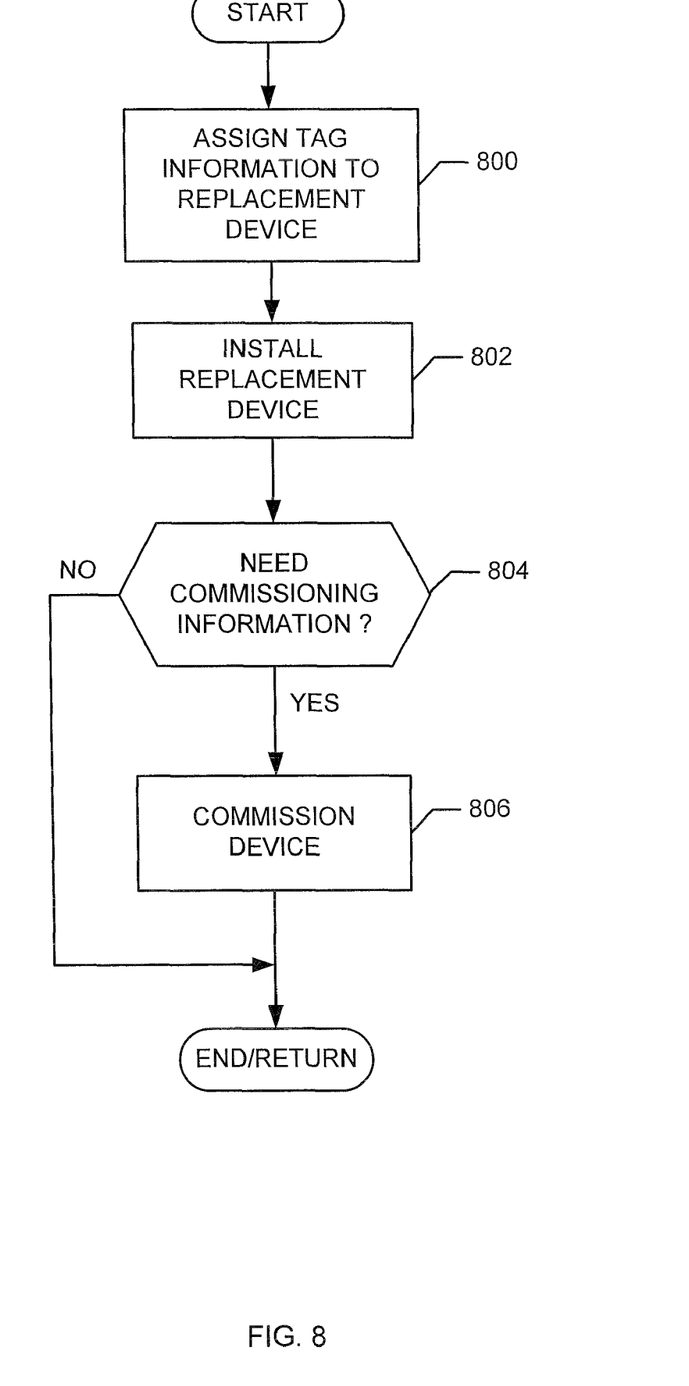
FIG. 8 is a flow diagram of an example of one manner in which the methods and apparatus described herein may be used to facilitate the replacement of a field device.

FIG. 8 is a flow diagram of an example of one manner in which the methods and apparatus described herein may be used to facilitate the replacement of a wireless enabled field device. Initially, a replacement wireless enabled field device may have tag information and/or other identifying information downloaded into or stored in its memory (block 800). The replacement wireless enabled field device may then be installed in the field to replace a failed or failing device. Upon power up, the replacement device may determine whether or not commissioning information is needed (block 804). Commissioning information may not be needed if such information has already been downloaded or otherwise locally stored for use by the replacement device. However, in the case where such commissioning information is needed, the replacement device is commissioned (block 806). The commissioning process may be similar or identical to the example methods shown in FIG. 5-7.

To provide a better understanding of the field device replacement technique generally described in connection with FIG. 8 above, a more detailed example of a wireless enabled field device replacement within the example process control system 400 is provided below. A system operator at, for example, the workstation 404 may receive an alert or alarm associated with the wireless enabled field device 422. In the event that the alert or alarm indicates that replacement of the field device 422 is required, the system operator may forward the alert or alarm to one of the wireless user devices 412 via the network 414 and communication link 416. The wireless user device to which the alert or alarm is routed may be, for example, a pager or cellular phone associated with a maintenance person.

Upon receiving the alert or alarm, the maintenance person may obtain a replacement device and assign (e.g., download or otherwise store) tag information to the replacement device. The maintenance person may then remove the failing or failed device and install the replacement device. Upon power up, the replacement device, which is a new wireless enabled field device 422, routes a commissioning request through the communication link 432, the wireless I/O interface 418, the controller 406 to the workstation 402, which may be performing configuration applications. The workstation 402 determines if the commissioning information associated with the tag or other identifier of the replacement wireless enabled field device 422 has already been stored in the database 444. If the commissioning information for the replacement device 422 is stored within the database 444, the operator at the workstation 402 may be notified that a request to replace the field device 422 has been received by the workstation 422. The operator may confirm the replacement with the maintenance person and then accept the request to replace at the workstation 402. Once the request to replace has been accepted at the workstation 402, the workstation 402 may download the commissioning information to the replacement wireless enabled field device 422.

Although certain apparatus constructed in accordance with the teachings of the invention have been described herein, the scope of coverage of this patent is not limited thereto. On the contrary, this patent covers all apparatuses, methods and articles of manufacture of the teachings of the invention fairly falling within the scope of the appended claims either literally or under the doctrine of equivalents.

What is claimed is:

1. A method of configuring a wireless enabled field device, comprising:
receiving identification information associated with the wireless enabled field device in a controller within a process control system, wherein the wireless enabled field device is at least one of a sensor or an actuator;
comparing the identification information to configuration database information;
retrieving via the controller configuration information associated with the wireless enabled field device based on the comparison of the identification information to the configuration database information;
updating a consolidated list of currently active wireless enabled field devices with the identification information associated with the wireless enabled field device; and
sending the configuration information to the wireless enabled field device via at least one wireless communication link to communicatively couple the wireless enabled field device to the controller based on the configuration information.

2. A method as defined in claim 1, wherein the identification information includes a device tag.

3. A method as defined in claim 1, wherein comparing the identification information to the configuration database information includes determining if at least a portion of the identification information matches at least a portion of the configuration database information.

4. A method as defined in claim 1, wherein receiving the identification information associated with the wireless enabled field device includes receiving a list containing identification information associated with a plurality of wireless enabled field devices.

5. A method as defined in claim 4, further including updating a consolidated list of currently active wireless enabled field devices based on the list containing identification information associated with the plurality of wireless enabled field devices.

6. A method as defined in claim 1, wherein receiving the identification information associated with the wireless enabled field device includes receiving at least one message from a controller communicatively coupled to the wireless enabled field device.

7. A method as defined in claim 1, wherein sending the configuration information to the wireless enabled field device includes sending the configuration information via the at least one wireless communication link and a second wireless communication link.

8. An apparatus for configuring a wireless enabled field device, comprising:
a memory; and
a processor coupled to the memory, wherein the processor is programmed to:
receive identification information associated with the wireless enabled field device, wherein the wireless enabled field device is at least one of a sensor or an actuator;
compare the identification information to configuration database information;
retrieve configuration information associated with the wireless enabled field device based on the comparison of the identification information to the configuration database information;
update a consolidated list of currently active wireless enabled field devices with the identification information associated with the wireless enabled field device; and
send the configuration information to the wireless enabled field device via at least one wireless communication link to communicatively couple the wireless enabled field device to the processor based on the configuration information.

9. An apparatus as defined in claim 8, wherein the identification information includes a device tag.

10. An apparatus as defined in claim 8, wherein the processor is programmed to compare the identification information to the configuration database information by determining if at least a portion of the identification information matches at least a portion of the configuration database information.

11. An apparatus as defined in claim 8, wherein the processor is programmed to receive the identification information associated with the wireless enabled field device by receiving a list containing identification information associated with a plurality of wireless enabled field devices.

12. An apparatus as defined in claim 11, wherein the processor is programmed to update a consolidated list of currently active wireless enabled field devices based on the list containing identification information associated with the plurality of wireless enabled field devices.

13. An apparatus as defined in claim 8, wherein the processor is programmed to receive the identification information associated with the wireless enabled field device by receiving at least one message from a controller communicatively coupled to the wireless enabled field device.

14. An apparatus as defined in claim 8, wherein the processor is programmed to send the configuration information to the wireless enabled field device by sending the configuration information via the at least one wireless communication link and a second wireless communication link.

15. A machine readable medium having instructions stored thereon that, when executed, cause a machine to at least:
receive identification information associated with the wireless enabled field device, wherein the wireless enabled field device is at least one of a sensor or an actuator;
compare the identification information to configuration database information;
retrieve configuration information associated with the wireless enabled field device based on the comparison of the identification information to the configuration database information;
update a consolidated list of currently active wireless enabled field devices with the identification information associated with the wireless enabled field device; and
send the configuration information to the wireless enabled field device via at least one wireless communication link to configure and initiate communication of the wireless enabled field device in a process control system.

16. A machine readable medium as defined in claim 15 having instructions stored thereon that, when executed, cause the machine to compare the identification information to the configuration database information by determining if at least a portion of the identification information matches at least a portion of the configuration database information.

17. A machine readable medium as defined in claim 15 having instructions stored thereon that, when executed, cause the machine to receive the identification information associated with the wireless enabled field device by receiving a list containing identification information associated with a plurality of wireless enabled field devices.

18. A machine readable medium as defined in claim 17 having instructions stored thereon that, when executed, cause the machine to update a consolidated list of currently active wireless enabled field devices based on the list containing identification information associated with the plurality of wireless enabled field devices.

19. A method as defined in claim 1, wherein the wireless enabled field device is configured by causing the storage or activation of a control strategy or at least one parameter on the wireless enabled field device.

20. A method as defined in claim 1, wherein the controller receives the identification information via a wireless broadcast from the wireless enabled field device.

21. A machine readable medium as defined in claim 15 having instructions stored thereon that, when executed, cause the machine to initiate communication of the wireless enabled field device by communicatively coupling the wireless enabled field device to a process control controller based on the configuration information.

\* \* \* \* \*